United States Patent [19]

Sawa et al.

[11] Patent Number: 4,507,039
[45] Date of Patent: Mar. 26, 1985

[54] AUTOMATIC PARISON FEED SYSTEM

[75] Inventors: Yuji Sawa; Yozo Kudo, both of Fukushima, Japan

[73] Assignee: Kureha Kagaku Kogyo Kabushiki Kaisha, Nihonbashi, Japan

[21] Appl. No.: 466,526

[22] Filed: Feb. 15, 1983

[30] Foreign Application Priority Data

Feb. 18, 1982 [JP] Japan .................................. 57-24832
Feb. 18, 1982 [JP] Japan .................................. 57-24833
Feb. 18, 1982 [JP] Japan .............................. 57-21739[U]

[51] Int. Cl.³ ............................................. B65G 25/00
[52] U.S. Cl. .................................... 414/152; 414/157; 221/297
[58] Field of Search ............... 414/147, 150, 152, 157; 198/395, 409, 474, 524, 531, 532, 651, 856; 221/297

[56] References Cited

U.S. PATENT DOCUMENTS

| | | | |
|---|---|---|---|
| 1,787,993 | 1/1931 | Meyer | 198/409 |
| 3,623,591 | 11/1971 | Koch et al. | 198/474 X |
| 3,698,536 | 10/1972 | Pray et al. | 198/651 X |
| 3,970,421 | 7/1976 | Moore | 414/152 X |
| 4,099,609 | 7/1978 | Kieronski et al. | 198/395 |
| 4,338,778 | 7/1982 | Suzuki et al. | 198/395 X |

FOREIGN PATENT DOCUMENTS 33912 of 0000 Japan.
43060 of 0000 Japan.

Primary Examiner—Joseph E. Valenza
Assistant Examiner—David A. Bucci
Attorney, Agent, or Firm—McDougall, Hersh & Scott

[57] ABSTRACT

The present invention relates to an automatic parison feed system for tubular plastic parisons. The parisons are fed, one at a time, from a parison feed unit into a parison loading unit. The parison loading unit, which holds a parison vertically, is positioned above a shuttered aperture in the upper wall of a heating furnace. The shutter of this aperture is opened as the parison loading unit descends vertically to a predetermined position within the furnace. The parison loading unit releases its parison, which falls onto a vertical parison pin mounted on an endless parison conveyor moving within the furnace. The parison loading unit is then raised from the furnace and the shutter is closed.

10 Claims, 13 Drawing Figures

FIG. 10
FIG. 12
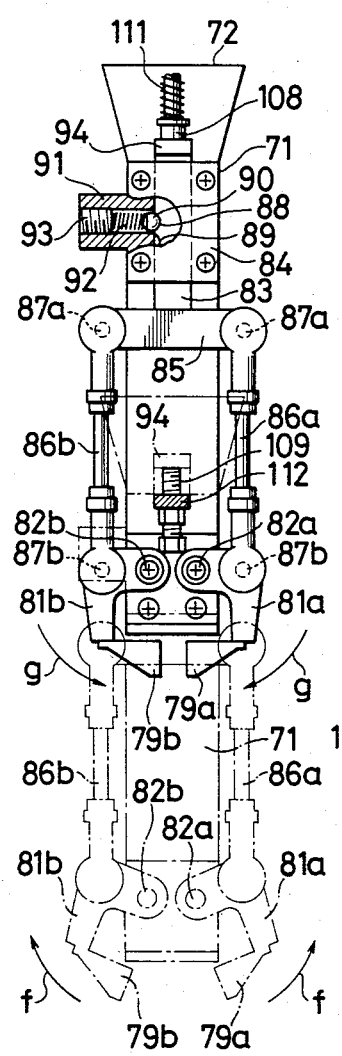
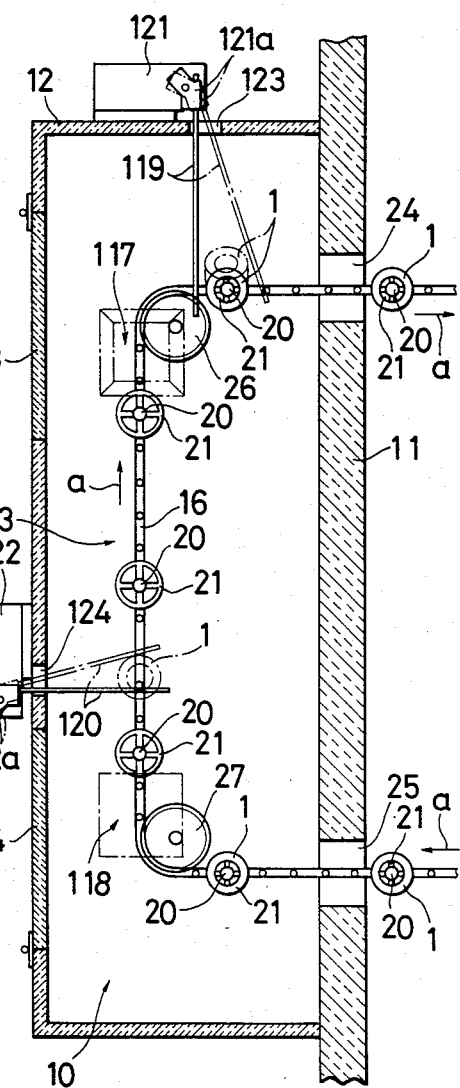

4,507,039

AUTOMATIC PARISON FEED SYSTEM

BACKGROUND OF THE INVENTION

1. Field of the Invention

The present invention relates to an automatic parison feed system whereby tubular parisons e.g. of plastics material are fed onto parison pins extending vertically upwards from a horizontal parison conveyor moving within a heating furnace.

2. Description of the Prior Art

Prior to forming a container or the like by biaxially stretching a parison by blow moulding, it is well known to feed the parison vertically onto a parison pin mounted on a parison conveyor which is moving as an endless loop within a heating furnace. The parison is heated up to a predetermined stretching temperature, then a predetermined blow molding is performed. A hot-air heating furnace is usually used. For example, in the case of a biaxially stretching blow molding of a polypropylene parison, it is necessary to heat the parison up to a stretching temperature near the melting temperature of the parison, e.g. 140°–170° C. For effecting uniform blow molding of parisons and ensuring high accuracy (prevention of thickness deviation, etc.), the parison must be heated uniformly throughout its circumference and overall length, and to this end the temperature within the heating furnace must be maintained uniform in a predetermined, narrow range.

In a prior invention (see Japanese Patent Publication No. 43060/1976 and Utility Model Publication No. 33912/1976) filed by the present applicant and already patented, an automatic parison feed system is mounted at a lateral side exteriorly of a heating furnace; part of a parison conveyor disposed within the heating furnace extends outside the heating furnace through a pair of slit-like passages formed in the side wall of the heating furnace; parisons are vertically fed, one at a time, onto parison pins mounted on the parison conveyor outside the heating furnace; and the fed parisons are conveyed successively into the heating furnace through one of the passages by means of the parison conveyor. In such an automatic parison feed system, however, the abovementioned passages must be kept open at all times to allow the continuously moving parison conveyor to pass through them. However, if such passages are kept open at all times, the hot air within the heating furnace may escape through them, and cold air may enter the furnace thus making it difficult to maintain the furnace temperature uniform within a predetermined narrow range. For this reason, in the prior invention in question, the heated state of parison is apt to be uneven, with the result that the blow molding after heating is inconsistent or its accuracy is deteriorated. Furthermore, due to the escape of hot air and admission of cold air, the fuel consumption required for heating is increased.

As is well known, moreover, a number of parison pins are mounted on the parison conveyor and a number of parisons which have been successively fed onto those pins are conveyed around a circuit defined by an endless conveyor, within the heating furnace, the parison conveyor being moved in a continuous manner. Parisons must thus be fed onto the parison conveyor in synchronism with the continuous movement of the conveyor. But this is by no means easy.

Furthermore, in the prior invention (Japanese Utility Model Publication No. 33912/1976), successively fed parisons are held in a vertical state within a hopper which is provided with a shutter at the lower end thereof; guides are disposed circularly above a parison conveyor for rotation in synchronism with the conveyor, and when one of the guides has reached a position under the hopper, the shutter is opened to let a parison descend into the guide until the parison is received on a fixed circular bottom plate mounted below the guide frame. The inserted parisons is then moved horizontally by the guide while it is slid on the bottom plate until it falls off the bottom plate, whereupon the parison is allowed to fall onto a parison pin mounted on the parison conveyor. The parison is now pushed onto the pin by a push rod which is disposed above the parison and which is raised and lowered by means of an air cylinder. This prior invention permits an automatic feed of parisons in synchronism with a continuous movement of the parison conveyor and has proved quite effective. However, since it is necessary that the opening and closing operation of the hopper shutter and the vertical drive for the push rod should be controlled with precise timing, the structure (especially control) is complex and the entire system becomes extremely large.

In the prior invention (Japanese Utility Model Publication No. 33912/1976), moveover, parisons are fed beforehand into a feed hopper in an obliquely upwardly inclined state, and the parisons in this inclined state are conveyed successively upwards in their inclined direction by means of an endless chain having pawls for pushing the parisons until they reach the upper end of the endless chain, from where the parisons are fed to a parison loading unit continuously in a vertical state.

In this prior invention, however, the feed of parisons to the parison loading unit is effected by utilizing the motion of the parisons, which, on reaching the upper end of the endless chain fall under their own weight. Thus, the feed is effected without forcibly changing the position of parisons. As a result, however, the parison feed motion is uncertain and often causes an erroneous feed. Moreover, the feed rate is limited by the parison feed rate to the parison loading unit. Therefore, the endless chain cannot be moved at high speed and the parison fed time tends to be long and it is difficult to make a quick feed.

SUMMARY OF THE INVENTION

It is an first object of the present invention to provide an improved parison feed system.

It is a second object of the present invention to provide an automatic parison feed system including a parison feed unit for feeding parisons successively, a vertically movable parison loading unit adapted to descend by a predetermined distance while holding vertically each of the parisons fed successively by the parison feed unit, and an opening formed in the upper wall of a heating furnace, which opening is provided with a shutter plate which can open and close the opening, in which the parison loading unit descends at least partially into the heating furnace through the opening after the shutter plate moves in its opening direction, the parison then being fed vertically onto a parison pin mounted on a parison conveyor which is moved along a path within the heating furnace, the parison loading unit being removed from the heating furnace after the parison is fed onto the parison pin and the shutter plate then closing the opening, the shutter plate being opened only at each feed of a single parison to the parison conveyor and closed again just after completion of each feed. The sealing of the heating furnace is thus improved and it is possible to reduce the likelihood of accidental changes in the temperature within the heating furnace caused by, as in the prior art, the escape of the hot air from, or the entry of cold air into, the furnace, thus permitting an extremely smooth automatic sucessive feed of parisons while maintaining the interior of the heating furnace as uniform as possible in a predetermined narrow temperature range and permitting a uniform heating of the parison throughout its circumference and overall length. The fuel consumption required for heating can be greatly decreased because it is possible to minimize the escape of the hot air from the heating furnace.

It is a third object of the present invention to provide an automatic parison feed system including a tubular, parison loading guide having open upper and lower ends, a vertical drive unit for vertically moving the parison loading guide, and a parison catch member attached to the lower end of the parison loading guide to open and close said lower end, the parison catch member being adapted to be opened when the parison loading guide reaches its lowered position and closed upon subsequent ascent of the parison loading guide, in which successively fed parisons are each inserted into the parison loading guide through the upper end of the latter and supported vertically by the parison catch member, the parison loading guide then descending in synchronism with the movement of a parison conveyor for transferring parisons to a heating furnace, the loading guide descending unitl its lower end is in close proximity to the upper end portion of a parison pin mounted on the parison conveyor, whereupon the parison catch member is opened, thereby allowing the parison to fall under its own weight over the parison pin. Accordingly, by a simple vertical stroke of the parison loading guide, parisons can be fed onto the parison pins in automatic sequence in synchronism with a continuous movement of the parison conveyor. During this operation the lower end of the parison loading guide descends to close to the upper end portion of the parison pin, so that the automatic feed of parisons can always be done without causing a erroneous feed at all. Furthermore, the structure is very simple, and the size of the entire system can be greatly reduced.

It is a fourth object of the present invention to provide an automatic parison feed system including a feed conveyor for conveying parisons which have been fed horizontally into the upper end of a feed hopper which comprises a sloping, fixed feed tray, a vertically driven kicker mounted at the lower end of the feed tray, and a chute adjacent the kicker and movable between a first, substantially horizontal position and a second, upwardly inclined position, in which the parisons which have been conveyed by the feed conveyor are fed onto the feed tray in their horizontal state and allowed to roll successively to the lower end of the feed tray, where they are pushed up one by one into the chute by means of the kicker, the chute then being swung to move a parison to an upwardly inclined position and feed it into a parison loading unit for loading onto a parison conveyor moving within a heating furnace. Thus, since the parison which has been fed in a horizontal position into the chute is then positively guided into an upright, e.g. vertical, state by the chute and fed in that state into the parison loading unit, the feed of parisons occurs with very little likelihood of an erroneous feed. Furthermore, since the parisons which have been conveyed onto the feed tray by the feed conveyor can be accumulated thereon in a predetermined quantity, it is not necessary to operate the feed conveyor at every feed of a single parison into the parison loading unit. That is, the feed conveyor may be operated continuously for a predetermined time to accumulate a predetermined number of parisons on the feed tray, and when a predetermined number of the accumulated parisons have been fed to the parison loading unit, the feed conveyor may be operated again continuously for a predetermined time to supplement parisons on the feed tray. It is thus not necessary to operate the feed conveyor frequently at short time intervals. Moreover, since the feed conveyor conveys parisons in a horizontal state, the parisons can be disposed on the feed conveyor at extremely small intervals. In other words, small movements of the feed conveyor can convey several parisons onto the feed tray. Consequently, the operation time of the feed conveyor can be shortened to a great extent, and the possibility of an early-stage damage of the feed conveyor and of its driving mechanism can be minimized so that a highly durable and reliable system is obtained. Furthermore, since the feed of parisons to the parison loading unit is effected by the cooperation of the kicker and the chute and is separately controlled from the conveyance of parisons by the feed conveyor, it is possible to feed parisons quickly to the parison loading unit.

DESCRIPTION OF THE DRAWINGS

The accompanying drawings illustrate an embodiment of the present invention, in which:

FIG. 10 is a sectional view taken on line X—X of FIG. 8;

FIG. 12 is a horizontal sectional plan view showing parison loading and unloading positions.

DESCRIPTION OF THE PREFERRED EMBODIMENT

An embodiment of the present invention will now be described with reference to the drawings.

Figure 1:
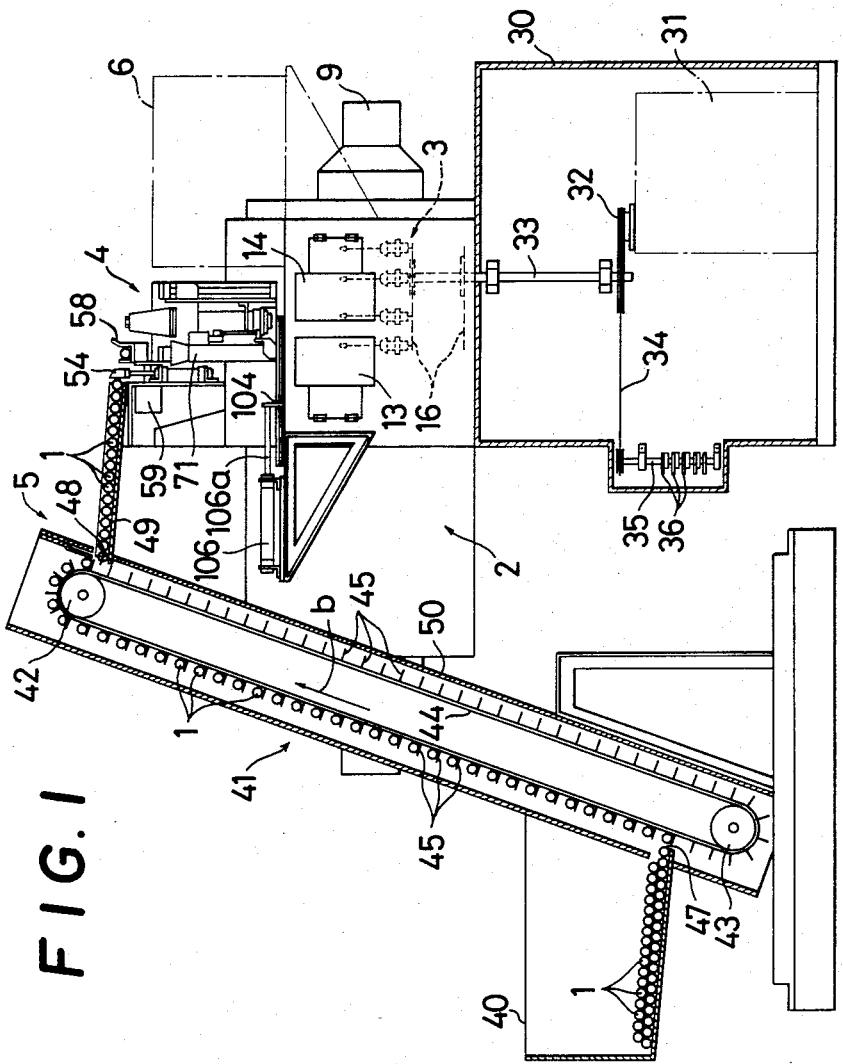
FIG. 1 is a partially cut-away side view of the whole feed apparatus.
Figure 2:
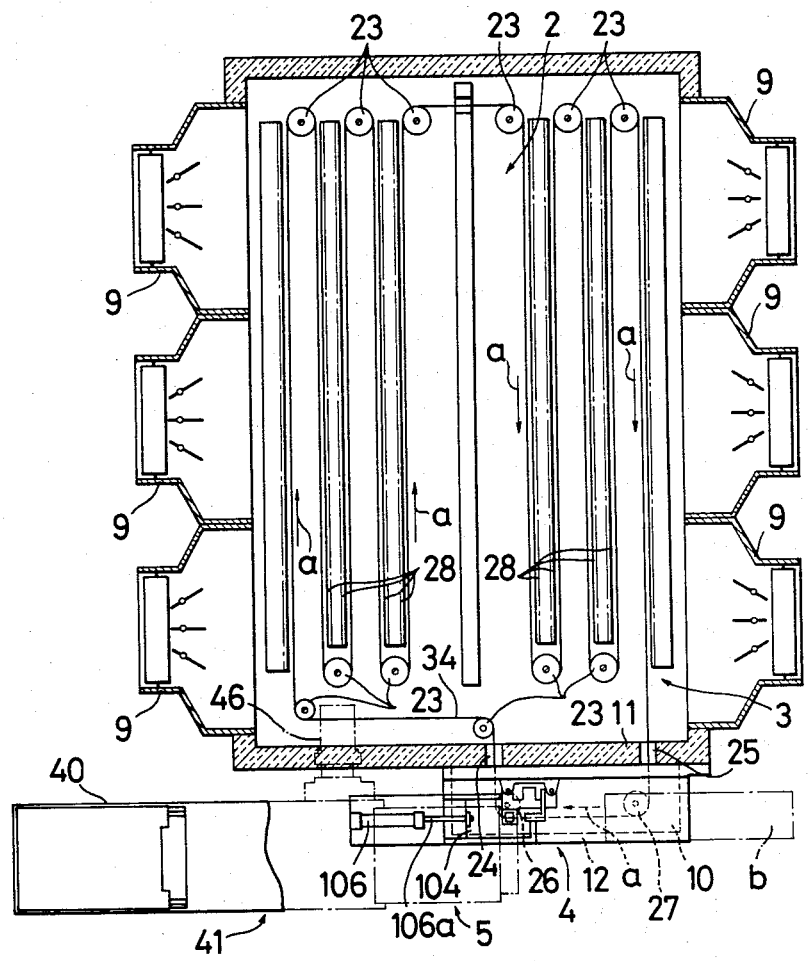
FIG. 2 is a partially cut-away plan view thereof.

Referring first to FIGS. 1 and 2, there is shown a heating furnace 2 for heating tubular plastic parisons 1, an endless parison conveyor 3 which is moved on a path within the heating furnace 2, a parison loading unit 4 for loading the parisons onto the parison conveyor 3, a parison feed unit 5 for feeding the parisons to the parison loading unit 5, and a parison unloading unit 6 for unloading the parisons from the parison conveyor 3.

The heating furnace 2 is a hot-air heating furnace, as shown in FIG. 2. The interior of the heating furnace is heated to a high temperature with hot air injected from a plurality of ducts 9 mounted in a pair of opposed side walls. In order to minimize the escape of hot air from the heating furnace 2 to thereby keep the temperature uniform throughout the interior of the heating furnace 2 in a predetermined narrow range, a parison loading and unloading workroom 10 is provided, the workroom 10 being outside the furnace and bounded by a workroom wall 12 and a side wall 11 of the heating furnace 2. In the workroom wall 12 are mounted a pair of open-close doors 13 and 14 in opposed relation to the parison loading position and parison unloading position, respectively, as will be described later.

Figure 13:
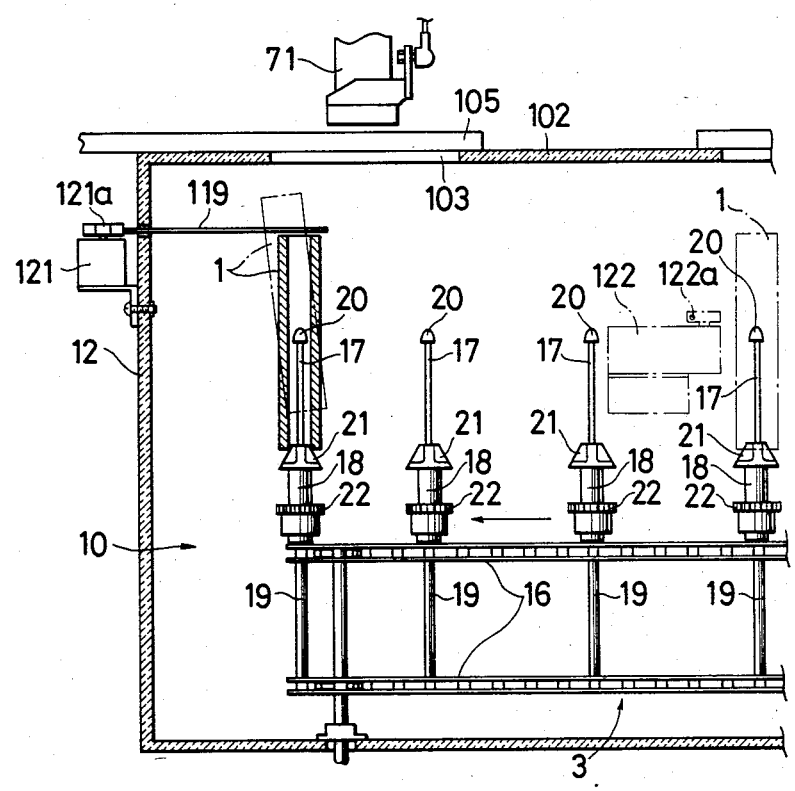
FIG. 13 is a vertical sectional side view thereof.

The parison conveyor 3, as shown in FIGS. 12 and 13, is provided with a pair of vertically spaced, endless chains 16 defining horizontal planes, and a large number of parison pins 17 extending vertically from the upper endless chain 16 at predetermined pitches. The parison pins 17 are each fixed onto the upper end of a support tube 18, which is fitted over the outer periphery of an upper end portion of a support pin 19 rotatably about a vertical axis thereof, the support pin 19 being mounted vertically between the pair of endless chains 16. At the upper and lower ends of the parison pin 17 are mounted a generally conical, parison anti-vibration collar 20 and a parison bearer 21, respectively. Further, a pinion 22 is mounted on the outer periphery of the lower end of the support tube 18. Within the heating furnace 2, as shown in FIG. 2, the parison conveyor 3 is moved in the direction of arrow "a" in FIG. 2 horizontally along a zigzag or boustrophedonic path while being guided by guide rails and guide sprockets 23 which guide the paired endless chains 16. At any given time a part of the parison conveyor 3 is within the workroom 10 having been conducted into the workroom 10 through passages 24 and 25 formed in the side wall 11 of the heating furnace 2. Within the workroom 10 the conveyor 3 is guided horizontally in the direction of arrow "a" by guide rails (not shown) and guide sprockets 26 and 27 which guide the paired endless chains 16. Along the path of movement of the parison conveyor 3 in the heating furnace 2 there are disposed a large number of horizontal racks 28 so that when the parison conveyor 3 is moved along its path in the direction of arrow "a" within the heating furnace 2, the pinions 22 of the parison pins 17 are successively engaged with the racks 28 and thereby rotated, whereby the parison pins 17 are turned about their axis while being moved horizontally.

As shown in FIG. 1, a pedestal 30 is mounted below the heating furnace 2, and a motor unit 31 having reduction gears is mounted in the pedestal 30. The parison conveyor 3 is moved continuously at a predetermined low speed by a driving shaft 33 which is driven by the motor unit 31 through a gear transmission mechanism 32 or the like. Furthermore, a cam shaft 35 is provided which is driven in synchronism through a chain transmission mechanism 34 or the like by means of the driving shaft 33, and timing cams 36 are mounted on the cam shaft 35 to control microswitches (not shown) for system control. More particularly, the timing cams 36 are rotated at low speed in synchronism with the parison conveyor 3 which is moved at a constant speed thereby making system controls such as control of the operation timing for a kicker and a swingable chute in the parison feed unit 5 and for a parison loading guide and a shutter in the parison loading unit 4, control for stopping the parison conveyor 3 at a given position, etc. as will be described later.

The parison feed unit 5 will be described hereinunder with reference to FIGS. 1 through 4.

Referring first to FIG. 1, a parison feed conveyor 41 is provided in a position contiguous to a parison feed hopper 40. The parison feed conveyor 41 comrises, for example, an endless chain 44 stretched between a pair of upper and lower sprockets 42 and 43, and a large number of conveyance plates 45 mounted at predetermined small intervals on the peripheral surface of the endless chain 44. The parison feed conveyor 41 is inclined at an angle as sharp as possible within a range which ensures a safe conveyance of the parisons 1, and the upper sprocket 42 is driven by a motor 46 whereby the endless chain 44 is moved in the direction of arrow "b" in FIG. 1.

As the parison feed conveyor 41 moves in the direction of arrow "b", a large number of parisons stacked horizontally within the parison feed hopper 40 are fed horizontally from a delivery port 47 of the hopper 40 to a lower end portion of the parison feed conveyor 41. The fed parisons 1 are put one by one onto the plates 45 of the endless chain 44 and conveyed in the direction of arrow "b". The parisons 1 thus conveyed up to an upper end portion of the parison feed conveyor 4 are successively discharged from a discharge port 48 formed at the upper end portion horizontally onto a feed tray 49 adjacent to the discharge port 48. The outer periphery of the parison feed conveyor 41 is covered with a cover 50.

Figure 3:
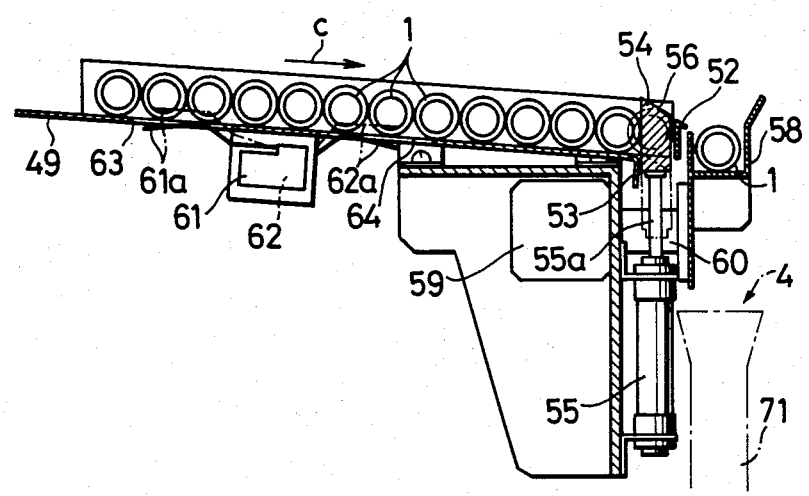
FIG. 3 is a vertical sectional side view of a parison feed unit portion.
Figure 4:
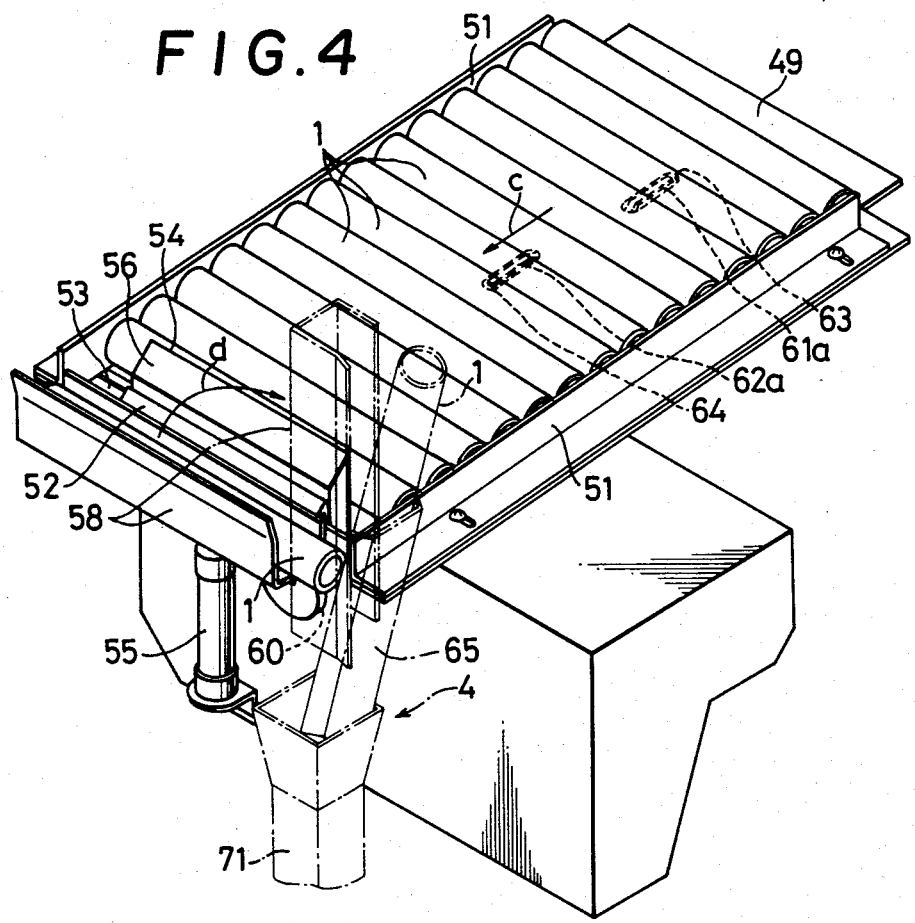
FIG. 4 is a perspective view thereof.

Referring now to FIGS. 3 and 4, the feed tray 49, which has a flat supporting base and upwardly projecting retaining edges 51, is inclined gently downward to one end. A stop plate 52 is mounted at the lower end of the feed tray 49, and an opening 53 is formed inside the stop plate, a kicker 54 being disposed within the opening 53. The kicker 54, is moved vertically between its lowered position shown in outline and its raised position shown in solid lines (both in FIG. 3) by means of a piston rod 55a of a vertical air cylinder 55. The upper end face of the kicker 54 is formed with an oblique surface 56 inclined at an acute angle downwardly to one end. Outside the stop plate 52 is disposed a chute 58. The chute 58, which is generally U-shaped in section, is movable between a first horizontal position and a vertical position i.e. is swingable through an angle of approximately 90 degrees. The chute is swung between its horizontal and vertical positions (shown in solid lines and in outline respectively in FIG. 4), by means of a swingable shaft 60 of a cylinder 59.

The parisons 1 which have successively been discharged from the parison feed conveyor 41 horizontally onto the feed tray 49 roll on the tray in the direction of arrow "c" and the leading parison strikes against the stop plate 52. A number of parisons 1 are then arranged as a row on the feed tray 49.

A pair of microswitches 61 and 62 are attached to the lower surface of the feed tray 49 so that actuators 61a and 62a of the microswitches 61 and 62 project above the base of the tray 49 through a pair of slits 63 and 64 provided in the base. As the parison 1 rolls on the tray 49 in the direction of arrow "c", the actuators 61a and 61b are successively depressed whereby the microswitches 61 and 62 are turned ON and OFF successively. When a predetermined number of parisons 1 are arranged on the tray 49 and the microswitch 61 at the upper end of the fixed tray 49 is kept ON for a predetermined time, the motor 46 is turned off by operation of a timer circuit whereby the discharge of the parisons 1 by the parison feed conveyor 41 is suspended.

On the other hand, the kicker 54 is in its lowered position shown in outline in FIG. 3, so the parison 1 which has been stopped by striking against the stop plate 52 rests on the oblique surface 56 of the kicker 54. After a predetermined interval the kicker 54 is brought up to its raised position shown in solid lines in FIG. 3 by means of the air cylinder 55. As a result the parison 1 is pushed upwardly, still in its horizontal state, by the oblique surface 56 and is raised over the stop plate 54, into the chute 58. Subsequently, the chute 58 is turned through an angle of approximately 90-degrees in the direction of arrow "d" in FIG. 4 by means of the cylinder 59. As a result, the parison 1 in the chute 58 is turned by approximately 90 degrees from its horizontal state into a vertical state, and so slides down from the chute 58 and is fed vertically into a parison loading guide. In this connection, a fixed inclined guide 65 of generally channel section is disposed with respect to the chute 58 in the vertical position of the chute with its channel facing the the channel of the chute, the inclined guide 65 thus helping to guide the parison 1 while it is fed into the parison loading guide. After this operation, the kicker 54 and the chute 58 are automatically returned to their original positions, lowered and horizontal respectively, and the next parison 1 is moved onto the oblique surface 56 of the kicker 54. By repetition of this series of operations, the parisons 1 arranged on the feed tray 49 are fed successively into the parison loading unit 4 until there is no parison on the actuator 61a, whereupon the actuator 61a again projects above the base of the feed tray 49, the microswitch 61 is turned OFF and the motor 46 is again turned onto resume discharge of the parison 1 by the parison feed conveyor 41. Thus, a predetermined number of parisons 1 are always arranged on the feed tray 49, but in the event of the number of parisons 1 on the tray 49 decreasing below the predetermined number by some cause or other, e.g. trouble of the parison feed conveyor 41, the actuator 62a of the other microswitch 62 projects onto the feed tray 49 and the microswitch 62 turns ON (the ON-OFF motion thereof being the reverse of that of the first microswitch 61) to operate a safety circuit for operation of an alarm buzzer, lamp or the like.

The parison loading unit 4 will be described hereinunder with reference to FIGS. 5 through 11.

Figure 5:
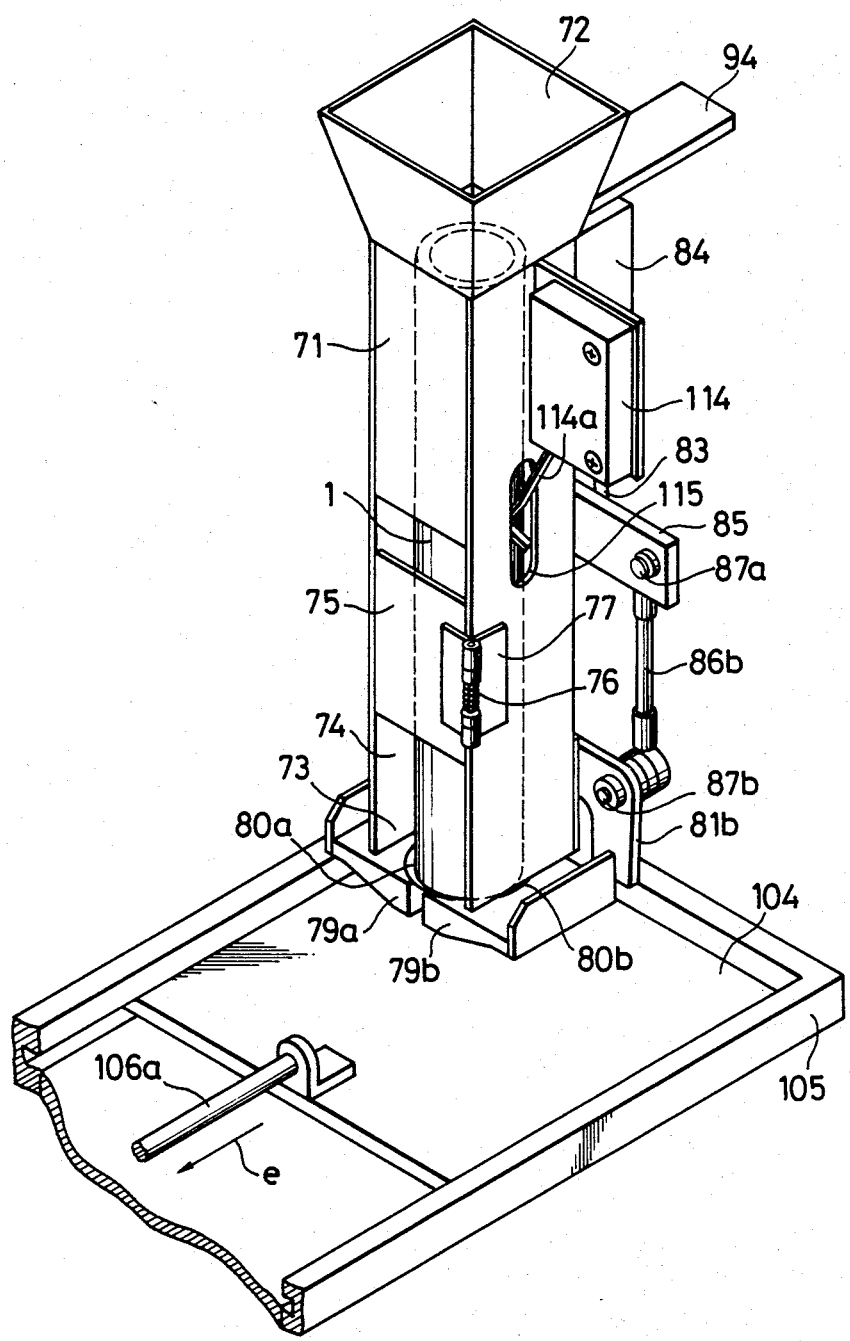
FIGS. 5 and 6 are each a perspective view of a parison loading unit portion.
Figure 6:
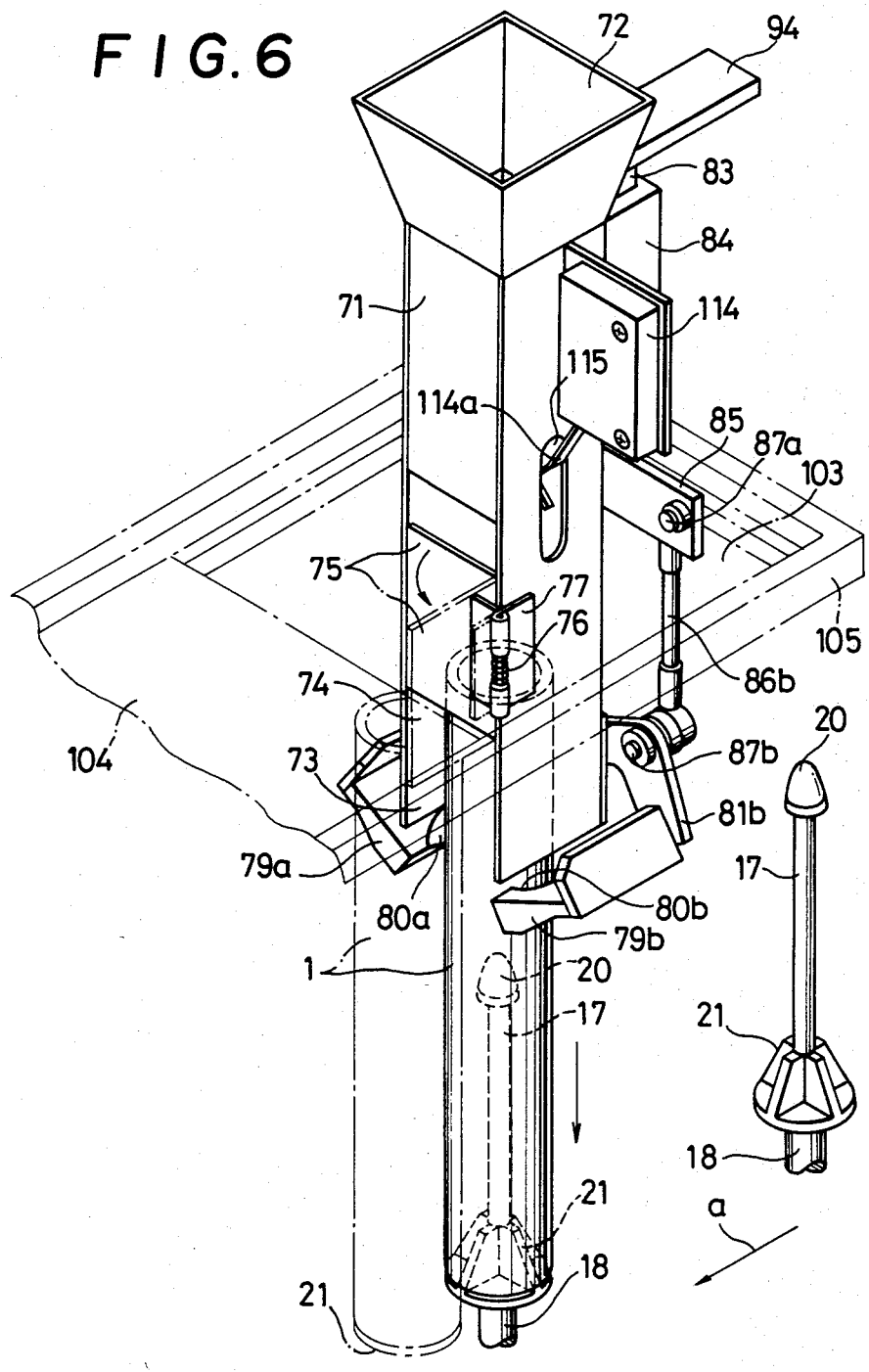

Referring firstly to FIGS. 5 and 6, a parison loading guide 71 is disposed vertically under the parison feed position of the chute 58. The parison loading guide 71 comprises a tube of square section and it is provided with openings 72 and 73 at upper and lower ends thereof, respectively. An opening 74 in the front face of the parison loading guide 71 extends by a predetermined height from the bottom of the guide 71. A door plate 75 is mounted at the upper part of the front opening 74. More specifically, the door plate 75 is pivotally secured to one side of the parison loading guide 71 by a hinge 77 which is provided with a spring 76, the spring 76 acting to maintain the door plate 75 in its closed state shown in FIGS. 5 and 6.

Figure 8:
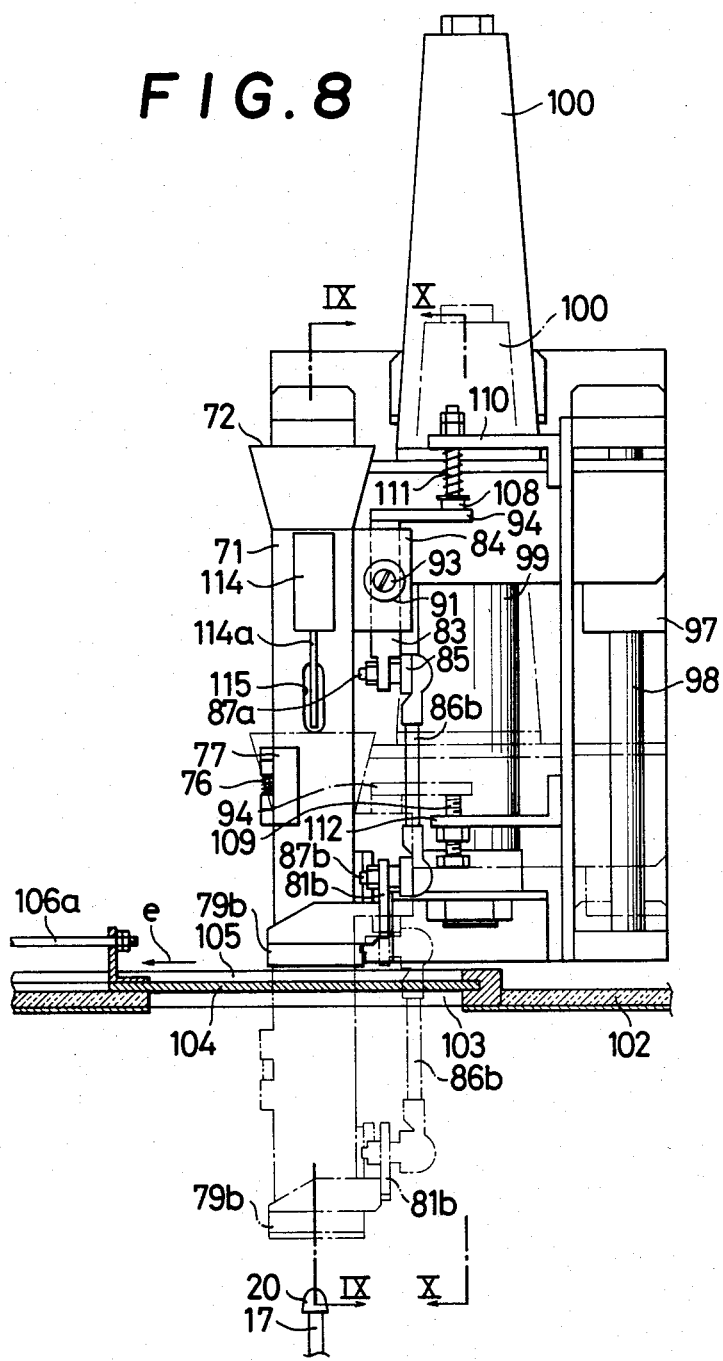
FIG. 8 is a partially cut-away side view thereof.
Figure 9:
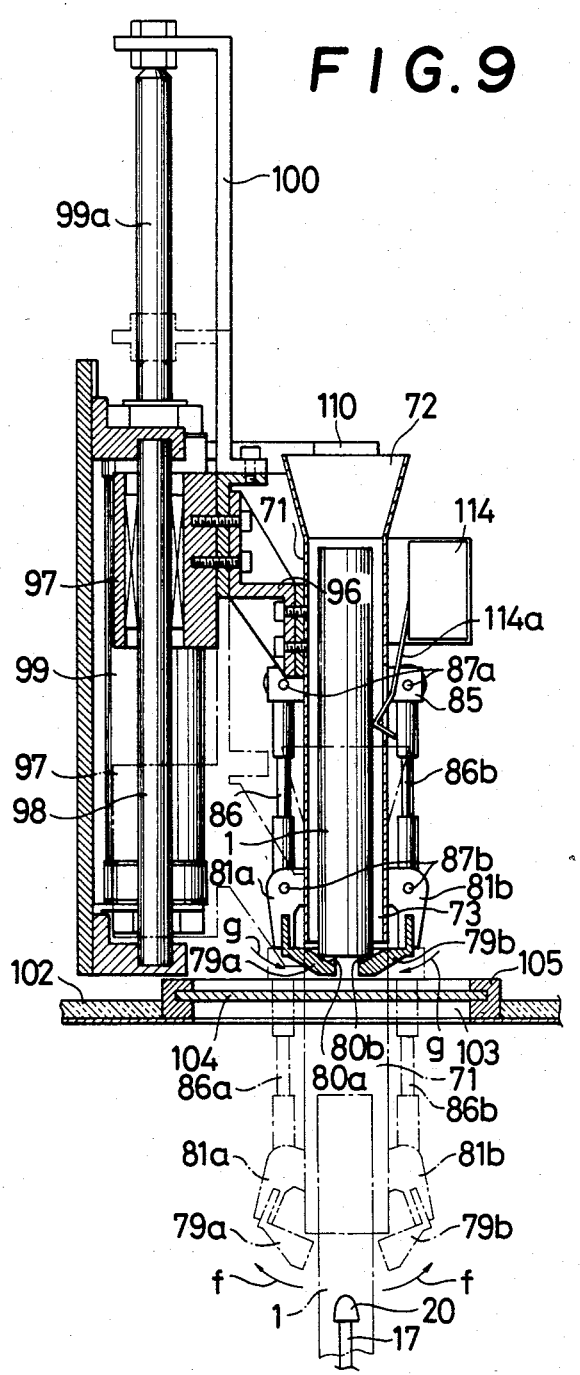
FIG. 9 is a sectional view taken on line IX—IX of FIG. 8.
Figure 11:
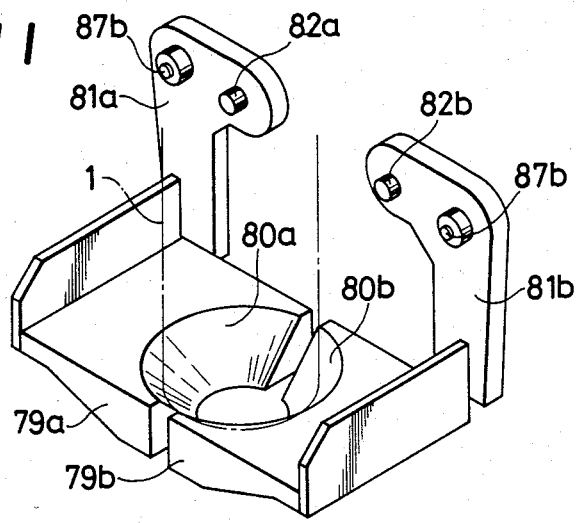
FIG. 11 is a perspective view of a parison catch member of a parison loading guide.

Referring now to FIGS. 9 through 11, a pair of left and right parison catch members 79a and 79b are provided under the lower end opening 73 of the parison loading guide 71, and on the upper surfaces of the parison catch members 79a and 79b are downwardly formed divided conical surfaces 80a and 80b resulting from dividing in two a conical surface which spans both parison catch members. Through a pair of symmetrically disposed, generally L-shaped links 81a and 81b the parison catch members 79a and 79b are connected to the back of the parison loading guide 71 pivotably in the transverse direction by a pair of pivot pins 82a and 82b. On the other hand, as shown in FIGS. 8 and 10, a control rod 83 for control of opening and closing of the parison catch members 79a and 79b is attached to the back of the parison loading guide 71 vertically and slidably through a slide guide 84. A connecting rod 85 is connected horizontally to the lower end of the control rod 83, and a pair of vertical connecting rods 86a and 86b connect between right and left end portions of the connecting rod 85 and end portions of the paired links 81a and 81b outside the pivot pins 82a and 82b. Upper and lower ends of the connecting rods 86a and 86b are respectively connected to the connecting rod 85 and both links 81a, 81b, through pins 87a and pins 87b, respectively. In one side of the control rod 83 are formed positioning recesses 88 and 89 in upper and lower positions, while a positioning steel ball 90 adapted to selectively engage the recesses 88 and 89 to effect positioning of the control rod 83 is retained within a ball holder 91 provided on one side of the slide guide 84. Within the ball holder 91 the steel ball 90 is urged to one side of the control rod 83 by means of a spring 92 which is held in place by a set-screw 93. To the upper end of the control rod 83 is connected an arm 94 which projects horizontally towards the back of the parison loading guide 71.

As shown in FIGS. 7 through 10, moreover, the parison loading guide 71 is fixed at the other side of its upper end portion to a slider 97 through a bracket 96. The slider 97 is vertically movable while being guided by a pair of perpendicularly fixed right and left guide shafts 98, and it is connected through a bracket 100 to the upper end of a piston rod 99a of a vertical air cylinder 99. Thus, the parison loading guide 71 is driven by the piston rod 99a of the air cylinder 99 vertically between its raised position shown in solid lines and its lowered position shown in outline in FIGS. 7 through 10.

Figure 7:
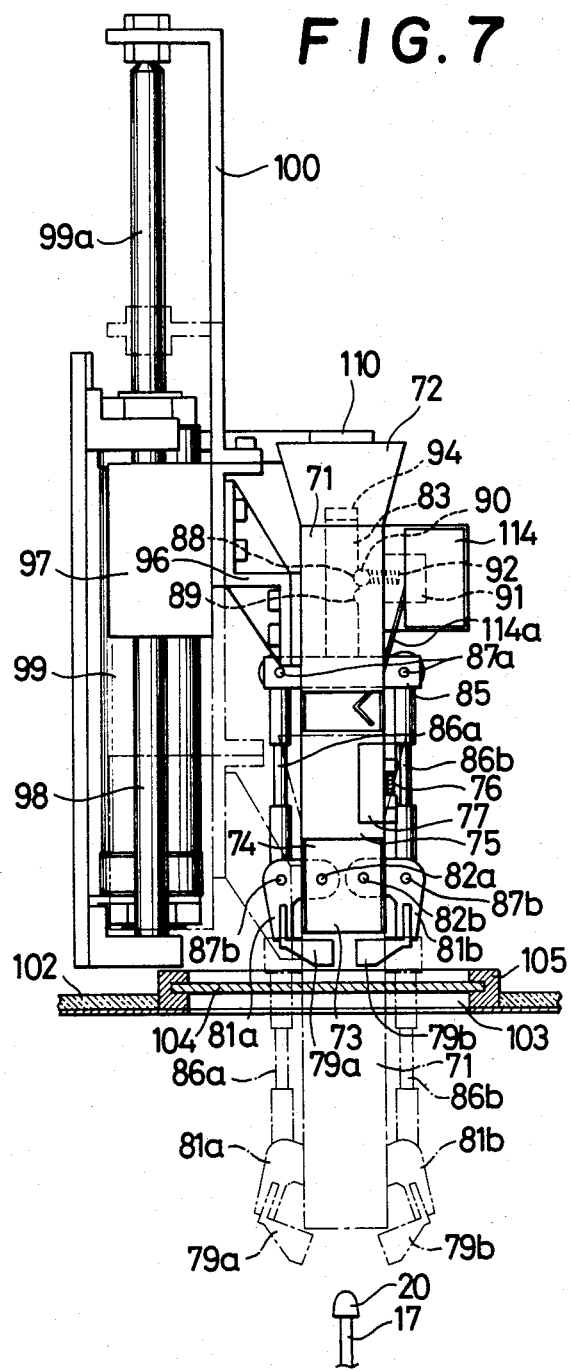
FIG. 7 is a partially cut-away front view thereof.

The parison loading guide 71, as shown in FIGS. 1 and 13, is disposed directly above the transfer path of the parison conveyor 3 in a position above an upper wall 102 of the workroom 10, and as shown in FIGS. 7, 8 and 13, an opening 103 is formed in the upper wall 102 in a position just under the parison loading guide 71 so that the parison loading guide 71 when descending to its lowered position passes through the opening 103 and enters the workroom 10. At this time, the lower opening 73 of the parison loading guide 71 is positioned close to the upper end of the parison pin 17 mounted on the parison transfer conveyor 3, and in this case the front opening 74 of the parison loading guide 71 is disposed so as to face the advancing side of movement (e.g. in the direction of arrow "a" in FIG. 12) of the parison conveyor 3.

As is shown in FIGS. 5 and 6, a shutter plate 104 is horizontally mounted to open and close the opening 103. The shutter plate 104, which is guided by a guide frame 105, is driven for opening and closing motion by means of a piston rod 106a of an air cylinder 106, as shown in FIG. 1.

Furthermore, as shown in FIGS. 8 and 10, a pair of upper and lower stops 108 and 109 are provided, with which the control rod 83 is brought into abutment when the parison loading guide 71 is raised to its upper position and descends to its lowered position, respectively. The upper stop 108 is mounted on a fixed bracket 110 and is vertically movable on that bracket. It is urged downwardly of the bracket 110 at all times by means of a cushioning spring 111. The lower stop 109 comprises an adjustment screw and it is inserted into a fixed bracket 112 threadedly from below and projects thereabove. As shown in FIGS. 5, 6 and 9, moreover, a microswitch 114 is attached to one side of the parison loading guide 71 and an actuator 114a thereof is inserted into the parison loading guide 71 through a slit 115 formed in the said one side of the guide 71.

Referring now to FIGS. 12 and 13, within the workroom 10 there is provided a parison loading position 117 for the loading of parison by the parison loading unit 4 and a parison unloading position 118 for the unloading of parison by the parison unloading unit 6 respectively at positions displaced, with respect to the advancing direction (the direction of arrow "a") of the parison transfer conveyor 3, by nearly one circuit of the conveyor. Further, in positions advanced from the parison loading position 117 and unloading position 118 with respect to the advancing direction (the direction of arrow "a") of the parison transfer conveyor 3 are mounted a pair of parison detecting pins 119 and 120. The parison detecting pins 119 and 120 are attached respectively through slits 123 and 124 formed in the workroom wall 12 to rotary actuators 121a and 122a of a pair of microswitches 121 and 122 which are mounted on the outside of the workroom wall 12. Thus, the parison detecting pins 119 and 120 project into the workroom 10 through the slits 123 and 124. Further, those pins 119 and 120 are urged anticlockwise from their displaced positions shown in outline in FIG. 12 to their returned positions shown in solid lines in the same figure by means of springs (not shown).

With the parison loading unit 4 constructed as above, when the parison loading guide 71 is in its raised position as shown in FIG. 5, the parison 1 is inserted vertically into the parison loading guide 71 through the upper opening 72 of that guide by means of the chute 58 of the parison feed unit 5 in the manner described above. At the same time, the control rod 83 is held in its lowered position with respect to the slide guide 84 by means of the steel ball 90 engaged within the upper positioning recess 88, as shown in solid lines in FIG. 10, and in association therewith the lower opening 73 of the parison loading guide 71 is closed by the parison catch members 79a and 79b, so that the parison 1 which has been inserted as described above into the parison loading guide 71 is stopped by the parison catch members 79a and 79b. The lower end of the parison 1 comes into engagement with the divided conical surfaces 80a and 80b and becomes centrally positioned within the parison loading guide 71. Furthermore, when the parison 1 is inserted into the parison loading guide 71, the actuator 114a of the microswitch is pushed and turns ON to detect a correct insertion of the parison 1 into the parison loading guide 71. On the other hand, in the event of the microswitch 114 failing to turn ON at a predetermined operation timing, a safety circuit for operation of an alarm, buzzer, lamp or the like is operated on the assumption that the parison 1 has not been fed correctly into the parison loading guide.

Then, after a predetermined interval, the shutter plate 104 is slid in the direction of arrow "e" in FIGS. 5 and 8 by means of the air cylinder 106 to open the opening 103. Subsequently, the slider 97 is pushed down by the air cylinder 99, and together with the slider 97 the parison loading guide 71 is inserted into the workroom 10 through the opening 103 and brought down to its lowered position, as shown in FIG. 6.

In this case, the descending motion of the parison loading guide 71 is effected in association with the movement of the parison conveyor 3; that is, the parison loading guide 71 descends to its lowered position in synchronism with the arrival at the parison loading position, i.e. the position just under the parison loading guide 71, of one of the parison pins 17 being moved continuously at low speed in the direction of arrow "a" in FIG. 12. When the parison loading guide 71 reaches its lowered position, its lower opening 73 is positioned close to the upper end of the parison pin 17 as shown in outline in FIGS. 7 and 8.

At almost the same time as the parison loading guide 71 reaches its lowered position, the arm 94 abuts the upper end of the lower stop 109 as shown in outline in FIGS. 8 and 10, and is pushed up relative to the slide guide. As a result, the control rod 83 is raised with respect to the slide guide 84, as are the horizontal connecting rod 85 and both vertical connecting rods 86a, 86b and the parison catch members 79a and 79b are pivotally moved through the links 81a and 81b in the direction of arrow "f" about the pivot pins 82a and 82b as shown in phantom in FIGS. 9 and 10 whereby the lower end opening 73 of the parison loading guide 71 is opened. At this time, as the control rod 83 is pulled up, the steel ball 90 comes off the upper positioning recess 88 against the spring 92 and engages with the lower positioning recess 89, so that the control rod 83 is located in a raised position with respect to the slide guide 84, while both parison catch members 79a and 79b are held in the opened state.

When the lower end opening 73 of the parison loading guide 71 is opened, the parison 1 within the guide 71 falls from the opening 73 under its own weight and is fitted from above over the outer periphery of the parison pin 17 as shown in solid lines in FIG. 6. At this instant, the parison 1 is engaged with the parison bearer 21 and held substantially vertically by the parison antivibration collar 20. Also during this motion of the parison 1 with respect to the parison pin 17, the parison conveyor 3 is being moved continuously at low speed. Consequently, the parison 1 thus fitted over the pin 17 pushes open the door plate 75 of the parison loading guide 71 and comes out of the front opening 74 of the guide 71, as shown in outline in FIG. 6.

After the parison 1 is fed to the parison pin 17 in the manner described above, the parison loading guide 71 is returned to its raised position by means of the air cylinder 99 and the shutter plate 104 is returned to its original closed position by means of the air cylinder 106 to gain close the opening 103. At this time, when the parison loading guide 71 is raised to its upper position, the rod 94 abuts the lower end of the upper stop 108 and is forced down relative to the slide guide 84, as shown in solid lines in FIGS. 8 and 10, while the accompanying impact is cushioned by the spring 111. As a result, the control rod 83 is lowered with respect to the slide guide 84, the connecting rod 85 and both connecting rods 86a, 86b are forced down, and the parison catch members 79a and 79b are pivotally moved through the links 81a and 81b in the direction of arrow "g" about the pivot pins 82a and 82b as shown in solid lines in FIGS. 9 and 10 whereby the lower opening 73 of the parison loading guide 71 is closed again. When the control rod 83 is forced down, the steel ball 90 is removed from the lower positioning recess 89 and is again engaged with the upper positioning recess 88, so that the control rod 83 is again located in a lowered position with respect to the slide guide 84, while the parison catch members 79a and 79b are held in the closed state described above.

The parison 1 which has been fed onto the parison pin 17 and held in a substantially vertical state is moved from within the workroom 10 into the heating furnace 2 by the parison conveyor 3. Within the heating furnace 2, by virtue of the aforementioned rotation of the parison pin 17, the parison 1 is turned on its axis while being moved in the direction of arrow "a" in FIG. 2 and it is heated uniformly throughout its circumference and overall length up to a stretching temperature of, for example, 140° C. to 170° C.

In the event of an error occurring in the operation of feeding the parison 1 onto the parison pin 17 by the parison loading unit 4, for example, in the event of the parison 1 being accidentally fed obliquely onto the parison pin 17, as shown in outline in FIG. 13, the inclined parison 1 abuts the parison detecting pin 119 and causes the latter to move pivotally from the rest position shown in solid lines to the position shown in outline in FIG. 12, whereupon the microswitch 121 turns ON to operate a safety circuit for operation of an alarm, buzzer, lamp or the like on the assumption that the operation of feeding the parison 1 to the parison insertion guide 17 was not performed correctly. At this instant, the parison conveyor is automatically stopped.

After the parison 1 has been heated, i.e. after it has been moved along the conveyor path within the heating furnace while being held in a substantially vertical state by the parison pin 17, and while turning on its axis, it is again returned to the workroom 10 and is taken out by the parison unloading unit 6 in the parison unloading position 118. Explanation of the parison unloading unit 6 is here omitted, but it is constructed so that, like the parison loading unit 4, it is inserted into the workroom 10 from an opening with a shutter plate formed in the upper wall of the workroom 10 and pulls out the parison 1 upwardly from the parison pin 17. At this time, should there occur an error in the removal of the parison 1 by the parison unloading unit 6, for example, in the event of the parison 1 remaining on the pin 17 and being conveyed to the parison loading position 117 as shown in outline in FIG. 13, the parison 1 abuts the parison detecting pin 120 and causes the latter to turn from the rest position shown in solid lines to the position shown in phantom in FIG. 12, whereupon the microswitch 122 turns ON to operate the safety switch for operation of an alarm, buzzer, lamp or the like on the assumption that the operation for removing the parison 1 was not performed correctly. At this instant, the parison conveyor 3 is automatically stopped.

Although in the embodiment described hereinabove the parison loading guide 71 is merely moved vertically between predetermined positions, it may be so constructed as to follow the movement of the parison conveyor, that is, it may be constructed so that after descent to its lowered position the parison loading guide 71 is moved horizontally by a predetermined distance in the direction of movement of the parison conveyor 3 at the same speed as the latter, then it is raised and at the same time moved back to its original returned position in the direction opposite to the moving direction of the parison conveyor 3.

What is claimed is:

1. An automatic parison feed system for feeding parisons one at a time onto parison pins projecting at predetermined intervals from an endless conveyor, the conveyor and pins moving in a furnace, the system comprising:
   an opening in an upper wall of the furnace and a shutter to open and close the opening;
   parison loading means for holding a parison substantially vertically, the parison loading means being above the opening;
   parison feed means for feeding parisons one at a time to the parison loading means;
   means for retracting the shutter from the opening;
   means for lowering the parison loading means through the opening to a predetermined position within the furnace, to feed a parison onto a parison pin;
   means for then raising the parison loading means from the furnace;
   and means for then returning the shutter to close the opening.

2. An automatic parison feed system according to claim 1 wherein said parison loading means comprises:
   a tubular parison loading guide having an open upper end through which a parison is received from the parison feed means and an open lower end through which the parison may pass when it is fed onto a parison pin;
   vertical drive means for vertically moving the parison loading guide in synchronism with the movement of the conveyor in the furnace;
   a parison catch member mounted at the lower end of the parison loading guide to support a parison in the loading guide;
   and a stop on the loading guide which causes the catch member to retract from the end of the loading guide when the loading guide has reached its lower position within the furnace, with its lower end opening adjacent a parison pin, so allowing the parison to fall onto the parison pin.

3. An automatic parison feed system according to claim 1, wherein said parison feed means comprises:
   a. a feed hopper for accommodating parisons in a substantially horizontal state;
   b. a feed conveyor for conveying the parisons accommodated within said feed hopper upwards, one by one, while keeping the parisons substantially horizontal;
   c. a feed tray for receiving substantially horizontal parisons conveyed from said feed conveyor, the feed tray being inclined to allow the parisons to roll along the feed tray;
   d. a kicker mounted at the lower end of the feed tray, said kicker being vertically drivable;
   e. a chute adjacent the kicker and movable between a substantially horizontal and an upright position, whereby the parisons which have been conveyed by said feed conveyor roll along the feed tray, the leading parison being pushed up into the chute by the kicker and the chute then swinging the parison therein into an upright position to allow the parison to be fed into said parison loading means.

4. An automatic parison feed system according to claim 2, wherein said parison catch member comprises a pair of parison catch pieces mounted at the lower end of said parison loading guide, said paired parison catch pieces being adapted to be pivotally moved simultaneously in directions opposite to each other to open said lower end opening.

5. An automatic parison feed system according to claim 4, wherein the upper surface of each parison catch piece comprises a half-conical surface, the half-conical surfaces being so positioned and aligned as to define together in the mutually adjacent position of the said catch pieces, one conical surface, the lower end of the parison in the parison loading guide being engaged with the conical surface so defined, so that the parison is positioned centrally in the loading guide.

6. An automatic parison feed system according to claim 2, wherein said parison loading guide is provided at a face which is perpendicular to the parison conveyor with:
   a wall opening which extends from the lower end of the parison loading guide;
   and a door plate mounted in the wall opening, a spring being provided to urge the door plate to a closed position, whereby a parison dropped onto a parison pin and moved by the conveyor pushes open the door plate and leaves the loading guide.

7. An automatic parison feed system according to any one of claims 1, 2, 4, 5 or 6, wherein said parison conveyor passes into a sealed workroom connected to a side wall of the furnace, a parison being fitted onto a parison pin in the workroom and the workroom further having a parison removal position such that the parison is removed from the furnace after travelling just under one circuit around the conveyor path.

8. An automatic parison feed system according to claim 7, and further including a detector to detect a parison fed incorrectly onto a parison pin, the detector being adjacent and downstream of the parison loading position, the detector causing the parison conveyor to stop when a parison protrudes above the normal position of a parison on a parison pin.

9. An automatic parison feed system according to claim 7, and further including a parison detector between the parison loading and unloading positions, the detector detecting parisons which are being conveyed between those positions and acting to stop the parison conveyor when a parison is so detected.

10. An automatic parison feed system according to claim 2, wherein said parison feed means comprises:
   a. a feed hopper for accommodating parisons in a substantially horizontal state;
   b. a feed conveyor for conveying the parisons accommodated within said feed hopper upwards, one by one, while keeping the parisons substantially horizontal;
   c. a feed tray for receiving substantially horizontal parisons conveyed from said feed conveyor, the feed tray being inclined to allow the parisons to roll along the feed tray;
   d. a kicker mounted at the lower end of the feed tray, said kicker being vertically drivable;
   e. a chute adjacent the kicker and movable between a substantially horizontal and an upright position, whereby the parison which have been conveyed by said feed conveyor roll along the feed tray, the leading parison being pushed up into the chute by the kicker and the chute then swinging the parison therein into an upright position to allow the parison to be fed into said parison loading means.

* * * * *